Dec. 12, 1939.  W. G. BLACK ET AL  2,182,938
ROTARY MACHINE
Filed March 22, 1938  3 Sheets-Sheet 1
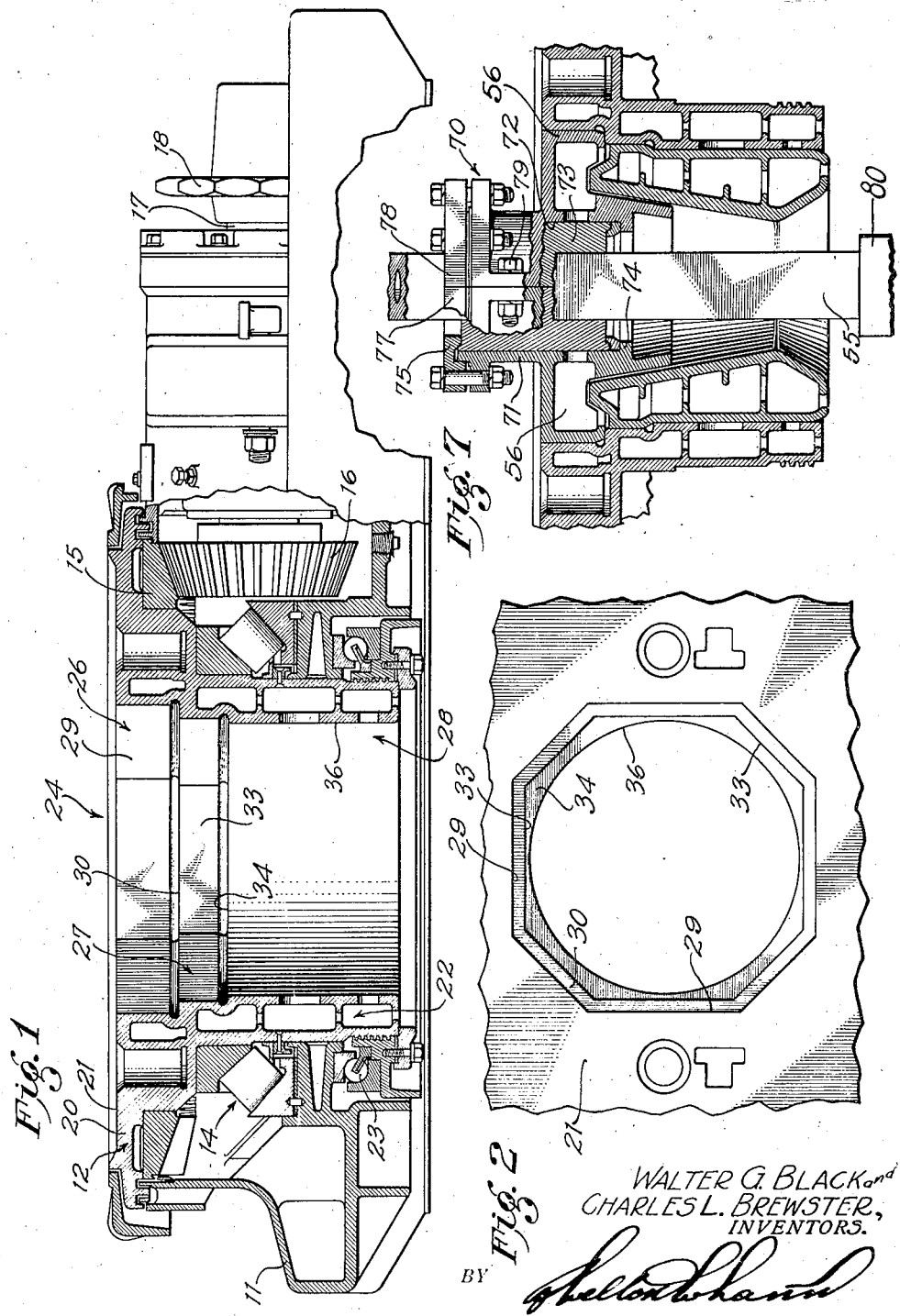
WALTER G. BLACK and
CHARLES L. BREWSTER,
INVENTORS.
BY
ATTORNEY Dec. 12, 1939.  W. G. BLACK ET AL  2,182,938
ROTARY MACHINE
Filed March 22, 1938  3 Sheets-Sheet 2

WALTER G. BLACK and
CHARLES L. BREWSTER,
INVENTORS.

BY
ATTORNEY

Dec. 12, 1939.      W. G. BLACK ET AL      2,182,938
ROTARY MACHINE
Filed March 22, 1938      3 Sheets-Sheet 3

WALTER G. BLACK and
CHARLES L. BREWSTER,
INVENTORS

BY
ATTORNEY

Patented Dec. 12, 1939

2,182,938

UNITED STATES PATENT OFFICE 2,182,938

ROTARY MACHINE

Walter G. Black, Oakland, and Charles L. Brewster, La Habra, Calif., assignors to Emsco Derrick & Equipment Company, Los Angeles, Calif., a corporation of California Application March 22, 1938, Serial No. 197,400

12 Claims. (Cl. 255—23)

Our invention relates to improvements in rotary machines of the class commonly employed for drilling oil wells.

In the drilling of an oil well by the rotary method it is the practice to employ a drill pipe which extends into the hole and has a bit secured to the lower end thereof. The upper end of the drill pipe is provided with a drive stem or kelly which is of rectangular cross-section, and this kelly extends through the table of a rotary machine which is supported on the derrick floor. For the purpose of driving the kelly it is the practice to provide a drive bushing or kelly bushing which is placed in the opening of the table of the rotary machine and which has an opening of rectangular cross-section through which the kelly extends. When stands of pipe are being connected to or disconnected from the drill pipe, slips supported in the table by a table bushing or master bushing are employed for supporting the drill pipe which extends into the hole.

It is an object of our present invention to provide a rotary machine of the general character referred to above in which wear on the table bushing by engagement of the drive bushing therewith is eliminated.

It is a further object of our invention to provide a rotary machine in which the table independently supports, within the table opening, the table bushing and the drive bushing.

It is a still further object of our invention to provide a rotary machine in which the drive bushing and table bushing are independently supported in the table opening and are each independently driven by the table, and in which these two bushings are wholly out of contact with each other, in order that the drive bushing will not transmit any driving forces or weight to the table bushing.

It is a still further object of our invention to provide a rotary machine in which the table bushing and drive bushing are independently supported and driven by the table and are both positioned within the table opening with the drive bushing substantially flush with the top wall of the table.

It is still another object of our invention to provide as a new article of manufacture a table for use as an element of a rotary machine, which table has a table opening which provides an upper shouldered section, a lower shouldered section, and a depending skirt section, and in which each of the shouldered sections have an upright driving shoulder and a lateral supporting shoulder, and in which the lower shouldered section is of smaller cross-section than the upper shouldered section.

Other objects and advantages of our invention will be pointed out in the course of the following detailed description of two forms of our invention which have been chosen for illustrative purposes. Our invention is not to be limited to the details of construction to be hereinafter described and which are illustrated in the accompanying drawings, but should be constructed to cover all modifications thereof which come within the spirit and scope of the appended claims.

Referring to the drawings in detail:

Fig. 1 is an elevational view partly in section showing a rotary machine and the table incorporating the features of our invention in section.

Fig. 2 is a fragmentary plan view of Fig. 1 showing the table opening.

Fig. 7 is a vertical sectional view corresponding to Fig. 5 but illustrating an alternative form of kelly bushing or drive bushing which our invention may employ.

Figure 4:
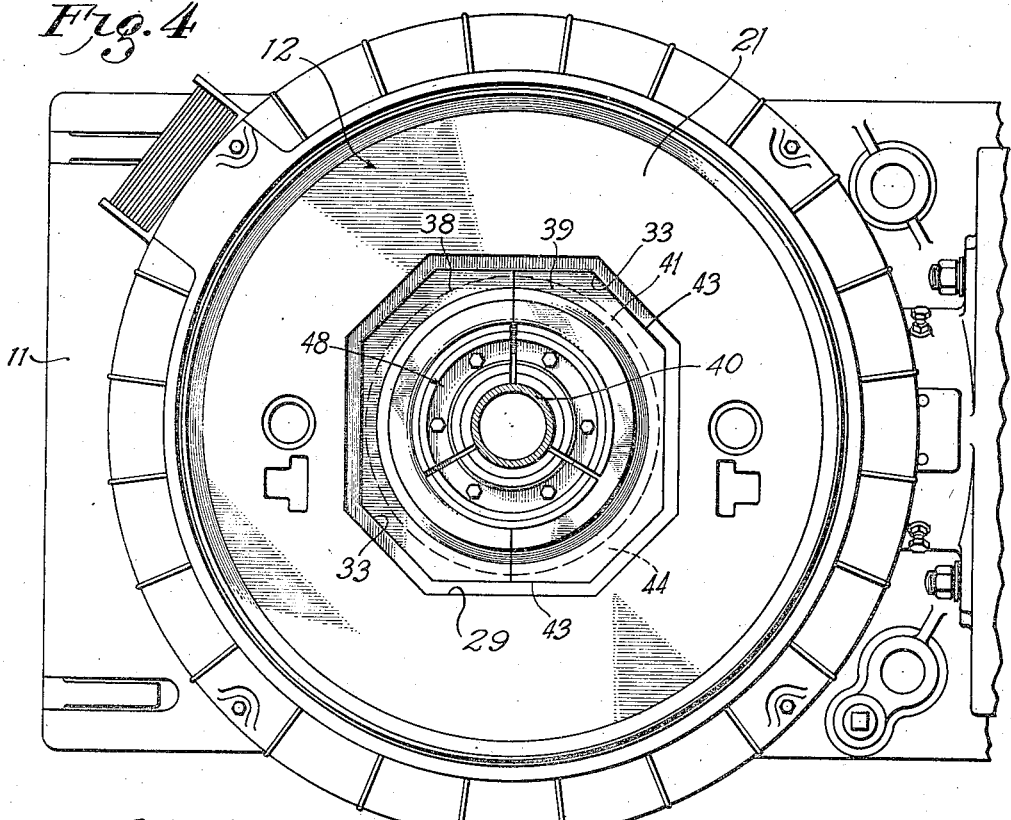
Fig. 4 is a plan view of Fig. 3.

Referring to the drawings in detail, and particularly Fig. 1, the numeral 11 represents a base on which a rotary table 12 is rotatably supported by a main bearing 14. The table 12 supports a ring gear 15 which is engaged by a pinion 16, which pinion 16 is supported on a shaft 17 which may be rotated through the medium of a sprocket 18. The general construction of the rotary machine does not constitute a part of the present invention, and our invention which will now be described may be incorporated in any of the rotary machines now in common use in the industry.

The table 12 has a top portion 20 which provides a top wall 21. Depending from the top portion 20 is a skirt 22 which is of general cylindrical shape and is surrounded by the main bearing 14, and its lower end may support a suitable hold-down bearing means 23, which hold-down bearing means is a part of the general rotary construction and does not constitute an essential element of the present invention. The table 12 has a table opening 24 which is concentric to the axis of rotation of the table and is divided into three sections, an upper shouldered section 26, a lower shouldered section 27, and a cylindrical or skirt section 28. The upper shouldered section 26 is preferably of polygonal cross-section and has vertical walls 29 which constitute driving shoulders, and has lateral or horizontal walls 30 which constitute supporting shoulders. The lower shouldered section is likewise of polygonal cross-section and has vertical walls 33 which constitute driving shoulders and lateral or horizontal walls 34 which constitute supporting shoulders. The lower shouldered section 27 is of smaller cross-sectional size than the upper shouldered section 26, as is clearly illustrated in Figs. 1 and 2. The skirt section 28 is of smaller cross-sectional size than the lower shouldered section 27 and provides an inner cylindrical wall 36.

Figure 3:
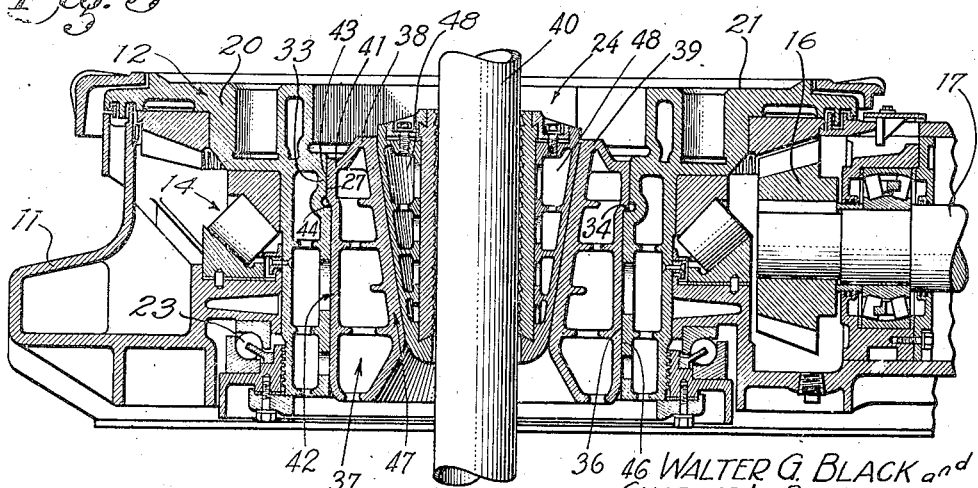
Fig. 3 is a vertical sectional view of the table end of the rotary machine showing the clip supporting bushing or table bushings and slips in place in the table opening.

In Figs. 3 and 4 we illustrate a slip supporting bushing or table bushing 37 positioned in the table opening 24. This table bushing 37 is preferably split into two halves 38 and 39 so that it may be installed in the table opening while a drill pipe, such as 40, is extending through the table opening. The table bushing 37 has an upper shouldered portion 41 and a lower cylindrical portion 42. The shouldered portion 41 rests in the lower shouldered section 27 of the opening 24 and has upright driving shoulders 43 which engage the driving shoulders 33, whereby relative rotation between the table and the drive bushing is prevented and whereby the table may be caused to drive the table bushing. The shouldered portion 41 also has lateral supporting shoulders 44 adapted to engage the supporting shoulders 34 of the lower shouldered section 27 in order to support the table bushing 37. The cylindrical portion 42 of the table bushing 37 has a cylindrical wall 46 which may engage the wall 36. The table bushing provides an inner wall 47 which is conical or tapered, as illustrated, and receives and supports a plurality of pipe slips 48 which, as illustrated in Fig. 3, engages and supports the drill pipe 40. There are preferably three slips which are insertable into the table opening from the top thereof by workmen on the derrick floor and may be provided with suitable handles (not shown).

The table bushing 37 is supported in the lower shouldered section and skirt section with the conical or tapered seat provided by the wall 47 in a position concentric to the axis of the table opening 24. The table bushing holds the slips 48 in proper aligned position to properly engage and support the drill pipe 40.

Figure 6:
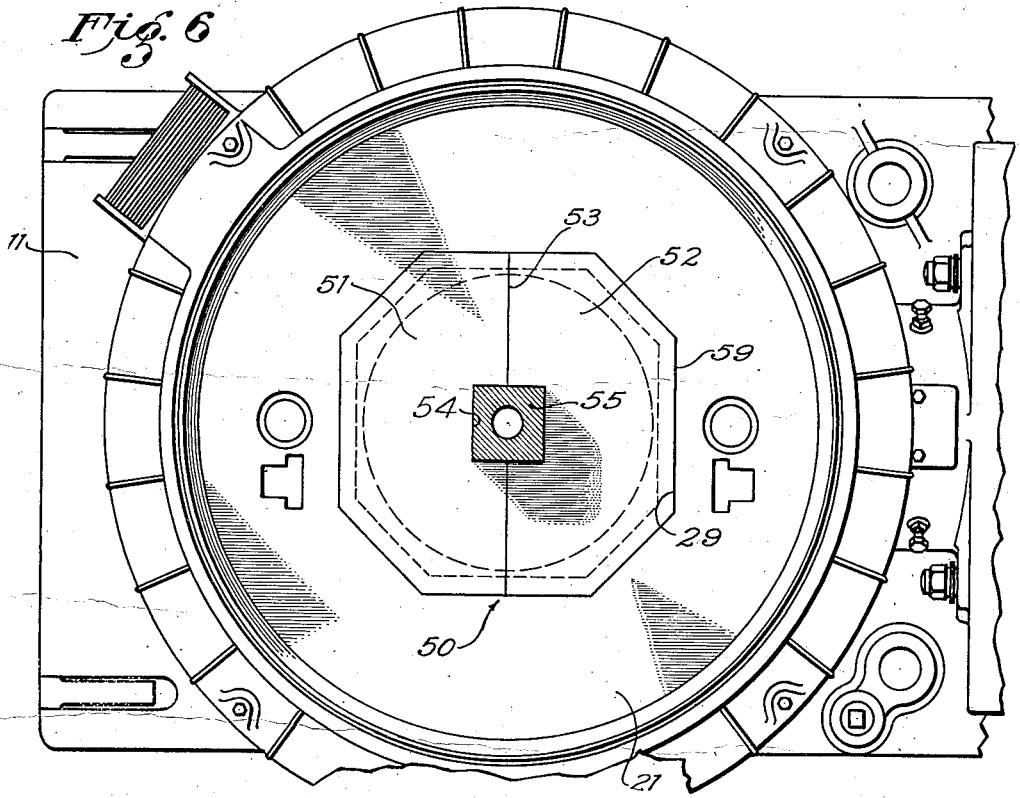
Fig. 6 is a plan view of Fig. 5.
Figure 5:
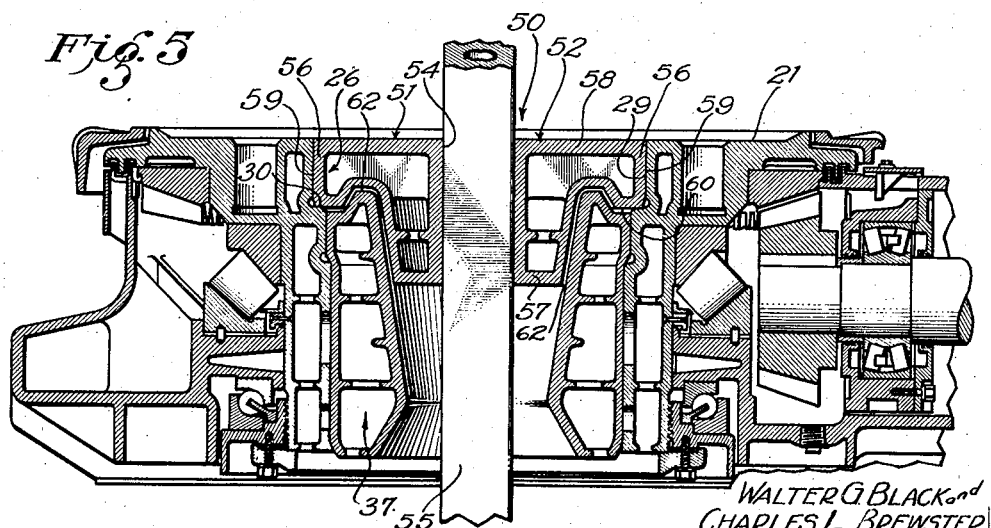
Fig. 5 is a vertical sectional view through the table end of the rotary machine and showing the kelly bushing or drive bushing in place in the table opening.

In Figs. 5 and 6 we illustrate our invention with the drive bushing in place and with the parts in the positions they occupy when the kelly is being driven. Referring to these two figures, the numeral 50 represents a kelly bushing or drive bushing of our invention which is preferably formed in two parts 51 and 52 which co-engage along a diametral line 53. The drive bushing 50 has a central opening 54 of rectangular or other polygonal cross-section and is adapted to drivably engage a drive stem or kelly 55 which is usually of rectangular cross-section. The drive bushing 50 includes a shouldered portion 56 and a depending portion 57. The shouldered portion is preferably of polygonal cross-section and corresponds in shape and size to the upper shouldered section 26 of the table opening 24. This shouldered portion 56 has a top wall 58 which is preferably flush with the top wall 21 of the table 12.

The shouldered portion 56 has vertical walls 59 which constitute driving shoulders and are adapted to engage the driving shoulders 29 of the upper shouldered section 26. Also provided as a part of the shouldered portion 56 is a lower wall 60 which constitutes supporting shoulders which are adapted to engage the supporting shoulders 30 of the upper shouldered section 26 of the opening 24. The depending skirt projects downwardly into the conical opening provided by the table bushing 37 and is provided in order that the walls of the opening 54 may be relatively long so as to give an ample driving connection between the drive bushing and kelly. When in driving position, as shown in Figs. 5 and 6, the drive bushing 50 is supported wholly within the table opening 24 and is supported by the supporting shoulders 30 and is driven by the driving shoulders 29. At this time, of course, the slips 48 are not in use, and in order that the drive bushing may be accommodated have been removed from the table bushing 37.

As clearly illustrated in Fig. 5, there is no contact whatsoever between the drive bushing 58 and the table bushing 37, and these parts are separated by a small space 62. The table therefore independently supports the drive bushing and the table bushing and independently drives each of these bushings. No driving force or weight is transmitted from the drive bushing 50 to the table bushing 37.

In the operation of our invention during the driving of the drill stem the parts are positioned as illustrated in Figs. 5 and 6. The table bushing 37 remains in place so that it is at all times ready for use. When it is desired to support the drill pipe, the kelly is pulled upwardly, the drive bushing 50 is removed, and the slips 48 inserted in place. The table bushing is used only for supporting the slips which support the drill pipe, and in our invention the table bushing is not called upon to support or drive the drive bushing, and is therefore subjected to a minimum of wear and disalignment. It will therefore function over a long period of time to properly support the slips 48. When it is necessary to move large objects through the drill table, the entire table opening may be made accessible by removing the table bushing 37.

In Fig. 7 we have illustrated an alternative form of drive bushing identified by the numeral 70 which is intended to be supported at all times by the kelly 55. In this form of our invention there is a cylindrical wall 71 which extends upwardly from the shouldered portion 56, and which cooperates with the remainder of the bushing to provide a central opening 72 in which kelly engaging blocks 73 are supported, these blocks being retained between a lower shoulder 74 and an upper retainer member 75. This bushing is preferably made in two parts 77 and 78 which are bolted together by bolts 79 after the parts have been assembled around the kelly 55. When the kelly is moved upwardly, the joint 80 at the lower end thereof will engage the drive bushing and lift it upwardly from the table opening. In the form of our invention it is not necessary to manually remove the drive bushing from place as in the prior form of our invention. However, in this form of our invention there is a projection above the top of the table which is not present in the form of our invention illustrated in Figs. 1 to 6 inclusive.

We do not wish our invention to be limited to the details of construction illustrated herein, but wish our invention to be broadly construed in accordance with the spirit and scope of the appended claims.

We claim as our invention:

1. In a rotary machine of the class described, the combination of: a base; a table rotatably supported by said base, said table having a table opening which includes an upper shouldered section and a lower shouldered section, each of said sections including a driving shoulder and a supporting shoulder; a table bushing in said opening having a shouldered portion positioned in said lower shouldered section of said table opening, said shouldered portion having a driving shoulder and a supporting shoulder engageable with corresponding shoulders of said lower shouldered section; and a drive bushing for driving a kelly, positioned in said table opening, having a shouldered portion in said upper shoulder section, said shouldered portion having a driving shoulder and a supporting shoulder engageable with corresponding shoulders of said upper shouldered section, said table bushing and said drive bushing being independently supported by said table and said drive bushing transmitting no driving forces or weight to said table bushing.

2. In a rotary machine of the class described, the combination of: a base; a table rotatably supported by said base, said table having a table opening which includes an upper shouldered section and a lower shouldered section, each of said sections including a driving shoulder and a supporting shoulder; a table bushing in said opening having a shouldered portion positioned in said lower shouldered section of said table opening, said shouldered portion having a driving shoulder and a supporting shoulder engageable with corresponding shoulders of said lower shouldered section; and a drive bushing for driving a kelly, positioned in said table opening with its upper wall substantially flush with the upper wall of said table, having a shouldered portion in said upper shouldered section, said shouldered portion having a driving shoulder and a supporting shoulder engageable with corresponding shoulders of said upper shouldered section, said table bushing and said drive bushing being independently supported by said table and said drive bushing transmitting no driving forces or weight to said table bushing.

3. In a rotary machine of the class described, the combination of: a base; a table rotatably supported by said base, said table having a table opening which includes an upper shouldered section and a lower shouldered section of smaller cross-sectional size than said upper shouldered section, each of said sections including a driving shoulder and a supporting shoulder; a table bushing in said opening having a shouldered portion positioned in said lower shouldered section of said table opening, said shouldered portion having a driving shoulder and a supporting shoulder engageable with corresponding shoulders of said lower shouldered section; and a drive bushing for driving a kelly, positioned in said table opening, having a shouldered portion in said upper shouldered section, said shouldered portion having a driving shoulder and a supporting shoulder engageable with corresponding shoulders of said upper shouldered section, said table bushing and said drive bushing being independently supported by said table and said drive bushing transmitting no driving forces or weight to said table bushing.

4. In a rotary machine of the class described, the combination of: a base; a table rotatably supported by said base, said table having a table opening which includes an upper shouldered section and a lower shouldered section of smaller cross-sectional size than said upper shouldered section, each of said sections including a driving shoulder and a supporting shoulder; a table bushing in said opening having a shouldered portion positioned in said lower shouldered section of said table opening, said shouldered portion having a driving shoulder and a supporting shoulder engageable with corresponding shoulders of said lower shouldered section; and a drive bushing for driving a kelly, positioned in said table opening with its upper wall substantially flush with the upper wall of said table, having a shouldered portion in said upper shouldered section, said shouldered portion having a driving shoulder and a supporting shoulder engageable with corresponding shoulders of said upper shouldered section, said table bushing and said drive bushing being independently supported by said table and said drive bushing transmitting no driving forces or weight to said table bushing.

5. In a rotary machine of the class described, the combination of: a base; a table rotatably supported by said base, said table having a table opening which includes an upper shouldered section and a lower shouldered section, each of said sections including a driving shoulder and a supporting shoulder; a table bushing in said opening having a shouldered portion positioned in said lower shouldered section of said table opening, said shouldered portion having a driving shoulder and a supporting shoulder engageable with corresponding shoulders of said lower shouldered section; and a drive bushing for driving a kelly, positioned in said table opening, having a shouldered portion in said upper shouldered section, said shouldered portion having a driving shoulder and a supporting shoulder engageable with corresponding shoulders of said upper shouldered section, said table bushing and said drive bushing being independently supported by said table, and said drive bushing being fully out of contact with said table bushing so that no driving forces or weight can be transmitted from said drive bushing to said table bushing.

6. In a rotary machine of the class described, the combination of: a base; a table rotatably supported by said base, said table having a table opening which includes an upper shouldered section and a lower shouldered section; a table bushing in said opening having a shouldered portion positioned in said lower shouldered section of said table opening; and a drive bushing for driving a kelly, positioned in said table opening, having a shouldered portion in said upper shouldered section, said table bushing and said drive bushing being independently supported by said table and said drive bushing transmitting no driving forces or weight to said table bushing.

7. In a rotary machine of the class described, the combination of: a base; a table rotatably supported by said base, said table having a table opening which includes an upper shouldered section and a lower shouldered section of smaller cross-sectional size than said upper shouldered section; a table bushing in said opening having a shouldered portion positioned in said lower shouldered section of said table opening; and a drive bushing for driving a kelly, positioned in said table opening with its upper wall substantially flush with the upper wall of said table, having a shouldered portion in said upper shouldered section, said table bushing and said drive bushing being independently supported by said table and said drive bushing transmitting no driving forces or weight to said table bushing.

8. In a rotary machine of the class described, the combination of: a base; a table rotatably supported by said base, said table having a table opening which includes an upper shouldered section and a lower shouldered section; a table bushing in said opening having a shouldered portion positioned in said lower shouldered section of said table opening; and a drive bushing for driving a kelly, positioned in said table opening, having a shouldered portion in said upper shouldered section, said table bushing and said drive bushing being independently supported by said table, and said drive bushing being fully out of contact with said table bushing so that no driving forces or weight can be transmitted from said drive bushing to said table bushing.

9. As a new article of manufacture, a table for use as an element of a rotary machine of the class described, said table having a top portion, a skirt depending therefrom, and a table opening through said top portion and skirt, said table opening having an upper shouldered section, a lower shouldered section, and a skirt section therebelow, said upper and lower shouldered sections each having a driving shoulder and a supporting shoulder, and said lower shouldered section being smaller in cross-section than said upper shouldered section.

10. In a rotary machine of the class described, the combination of: a base; a table rotatably supported by said base, said table having a table opening; a table bushing in said table opening having a driving shoulder and a supporting shoulder; walls forming a driving shoulder and a supporting shoulder on said table in said table opening engageable by corresponding shoulders of said table bushing; a drive bushing at least partly in said table opening having a driving shoulder and a supporting shoulder; and walls forming a second driving shoulder on said table in said table opening and a second supporting shoulder on said table engageable by corresponding shoulders of said drive bushing, said table bushing and said drive bushing being independently supported by said table and being independently driven by walls formed within said table opening, and said drive bushing transmitting no drive forces or weight to said table bushing.

11. In a rotary machine of the class described, the combination of: a base; a table rotatably supported by said base, said table having a central table opening; a table bushing; a drive bushing; wall means on said table and inside said table opening for independently supporting said table bushing and said drive bushing by said table and in said table opening, said means supporting said bushings out of contact with each other so that said drive bushing transmits no driving force or weight to said table bushing; and walls formed within said table opening for independently driving said drive bushing and said table bushing from said table.

12. In a rotary machine of the class described, the combination of: a base; a table rotatably supported by the base, said table having a table opening; a multi-part table bushing fitted in said table opening and confined against lateral expansion by the side walls of said table opening, the top surface of said table bushing being positioned below the top surface of the table to leave a portion of the table opening above the table bushing unoccupied by said bushing; a multi-part drive bushing positioned so as to fill said unoccupied portion of the table opening and to have at least a portion of the same depending into the table bushing, said depending portion of the drive bushing being smaller than the bore of the table bushing so as to leave a space between the same, the side walls of the table opening engaging and confining the driving bushing parts against lateral expansion so as to avoid radial contact between the table bushing and the portion of the drive bushing depending thereinto, the portions of the table opening side walls which confine said table and drive bushing parts against lateral expansion and the portions of the walls of said bushings which engage the same being of such cross-sectional shape as to provide drive connections between the table and both bushings; and wall means formed at different vertical levels on said table and both of said bushings for independently supporting said table and drive bushings.

WALTER G. BLACK.
CHARLES L. BREWSTER.